United States Patent [19]

Schmidt

[11] 4,018,094
[45] Apr. 19, 1977

[54] APPARATUS FOR INTERMITTENTLY TURNING A TURBINE SHAFT

[75] Inventor: Horst Schmidt, Saalfelden, Austria

[73] Assignee: Sulzer Turbomaschinen AG, Zurich, Switzerland

[22] Filed: Aug. 27, 1975

[21] Appl. No.: 608,289

[30] Foreign Application Priority Data

Sept. 11, 1974 Switzerland .................... 12342/74

[52] U.S. Cl. .................... 74/128; 74/126
[51] Int. Cl.² .................... F16H 27/02
[58] Field of Search ............ 74/128, 126, 129, 142

[56] References Cited
UNITED STATES PATENTS 3,101,013  8/1963  Ayers et al. .................... 74/128

*Primary Examiner*—Samuel Scott
*Assistant Examiner*—Wesley S. Ratliff, Jr.
*Attorney, Agent, or Firm*—Pierce, Scheffler & Parker

[57] ABSTRACT

Apparatus for intermittently turning a turbine shaft wherein a ratchet wheel is secured upon the shaft and is engaged intermittently by a to and fro movement of a ratchet arm actuated by a reciprocating drive mechanism. The ratchet arm has a combined rectilinear and pivotal movement and is provided with a device, operable in the event the ratchet wheel is put into rotation by starting up of the turbine while the ratchet arm is engaged with the ratchet wheel, for detaining the arm against a return pivotal movement towards the ratchet wheel after being hurled outwardly therefrom to a predetermined position.

8 Claims, 6 Drawing Figures

APPARATUS FOR INTERMITTENTLY TURNING A TURBINE SHAFT

The present invention relates to an improved apparatus to turn intermittently a shaft, especially a turbine shaft, comprising a ratchet wheel fastened to the shaft and at least one ratchet arm actuating mechanism to engage the ratchet wheel and to turn it intermittently, the arm being able to deflect about an axis which extends parallel to the axis of the ratchet wheel.

After a cutoff of a turbine, a continuous rotation of the turbine shaft, and thus of the turbine rotor, is maintained over a certain period of time by means of a shaft-turning apparatus. In this manner there is attained a uniform cooling of the rotor, eliminating excessive differences in temperature between its upper and its lower side, and the machine can also be re-started immediately if necessary. If the turbine is cut off without any further turning of the rotor, the heat stored by its structural components will heat up the surrounding air, causing it to rise. This will not affect significantly the stationary parts of the machine because they are relatively short and are supported outwardly. The rotor however, being supported at its two end bearings, forms a long, substantially cylindrical body, its top portion cooling off at a much lower rate than the bottom portion, with the result that it will retain its heat-generated elongation for a greater period of time, causing the rotor to bend upwardly. This motion can neutralize the relatively small clearances of the blade and packing boxes and parts of the rotor will come into contact with stationary parts which might prevent a re-starting of the machine and might also lead to damages.

In order to prevent these occurrences the rotor is kept at a certain shaft speed with the aid of the above-mentioned turning apparatus to insure that each portion of the rotor periphery is cooled in a uniform manner. This shaft-turning apparatus is controlled by the power mains. In case of power failure or break-down of the turning apparatus, the device for intermittent turning comes into action, which turns the rotor by 180° when 30 minutes have elapsed.

Solutions used heretofore, and employed by BBC Brown Boveri & Cie for a long time, operate by use of a switching mechanism which is installed in the upper part of the housing and which contains an arm in a substantially horizontal position activated by a crank shaft and crank pin. The crank shaft is turned either manually by use of a simple transmission, or with the aid of a d.c. motor by way of a step-down gearing so that the operation can be continued in case of power failure by battery-supplied current. The arm engages at each turn of the crank shaft a tooth space of the ratchet wheel, fastened to the turbine shaft, turning the turbine shaft about an angle corresponding to the spacing of the ratches wheel. During the second half of the crank shaft rotation, the ratchet arm is raised by means of a control rail, and wll then engage the next spacing of the ratchet wheel by its own dead weight.

If the turbine is started while the arm is in contact with the ratchet wheel, the arm is hurled by the ratchet wheel into a locking device, installed separately in the upper portion of the housing, as soon as the turbine has reached a certain speed, and is then held in place by this device, an arrangement which represents the present state of art, the device comprising a U-shaped leaf-spring bracket, with each leg of the "U" being provided with a jaw. When the turbine reaches the critical speed, the ratchet arm is hurled at the jaws, forcing them apart and passing through the two jaws. The jaws will then spring back and detain the arm. When the mechanism is reactivated, the arm is pulled from the locking device and engages again the ratchet wheel due to its dead weight.

The known ratchet type shaft turning systems are disadvantageous, first because a locking device is required which is arranged separately from the ratchet arm and installed in the upper portion of the housing, a device which not always functions properly, and secondly because the contact of the horizontal ratchet arm with the ratchet wheel is accomplished by the dead weight of the arm itself and is therefore not controllable. Furthermore, the specific design requires the placement of the device within the upper portion of the housing, thus making it impossible to use the shaft turning mechanism when the machine is opened. Finally, the mechanism is unnecessarily complicated, costly in outlay and space-consuming.

It is the principal object of the invention to eliminate the above-discussed disadvantages of the known shaft turning systems and to establish an apparatus of the above defined type with a deflecting and locking device which forms an integral unit with the ratchet arm and which will always function properly, which has a ratchet arm that is mechanically coupled to the ratchet wheel and that can be arranged at the perimeter of the ratchet wheel at any point desired, a device which will not require a gear drive and crank shaft for the operation of the arm, and which can be installed in an efficient manner within the lower part of the housing, so that it will be operational even if the machine is opened, and an apparatus which will be less complicated and less costly than the sytems of record, and which will take up less space then the known arrangements.

The invention solves the problem in that manner that the arm deflection device is designed as one part of a locking device which will retain the arm at a position attained by deflecting the arm away from the ratchet wheel about a certain, pre-determined angle, the locking device preventing the arm from deflecting back to the ratchet wheel.

A preferred embodiment of the invention will now be described in conjunction with the accompanying drawings wherein.

Identical components are denoted by identical reference numerals in the several figures.

Figure 5:
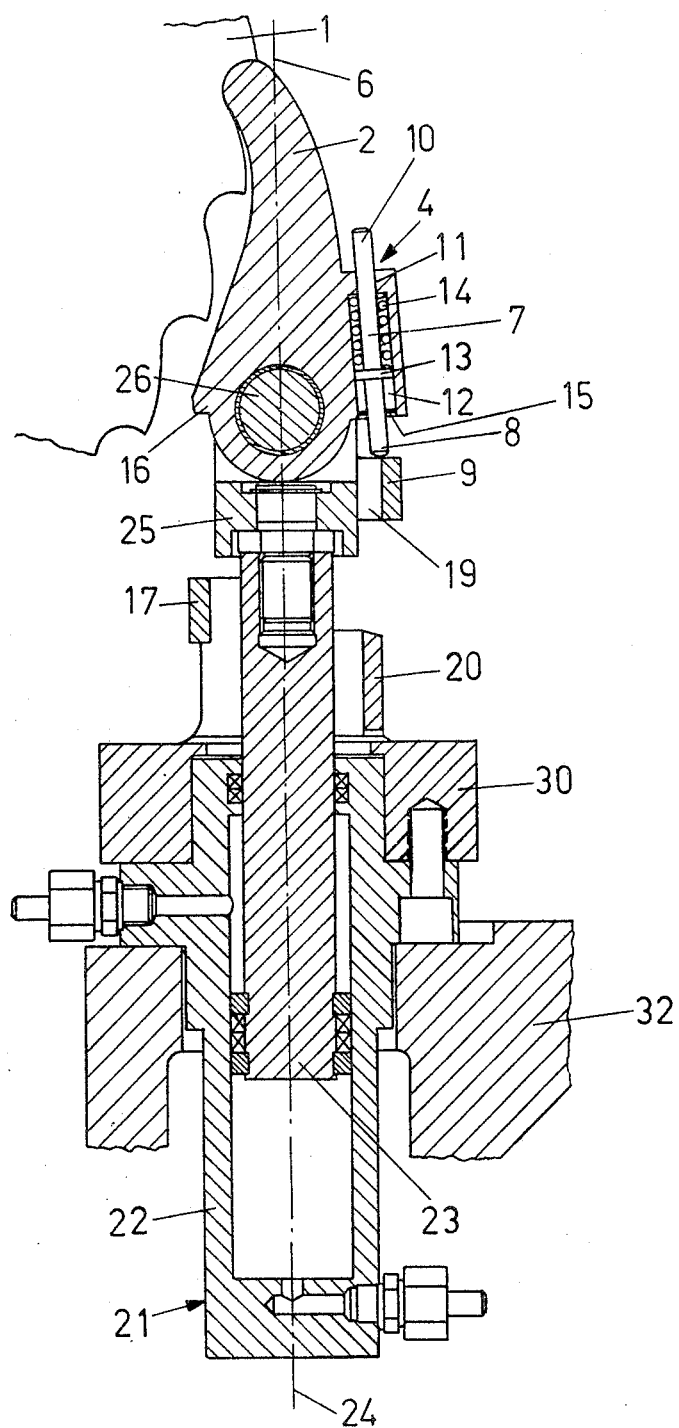
FIG. 5 is a sectional view similar to FIG. 3, with the ratchet arm located in its second end position, i.e. after deflection in the direction of the ratchet wheel.

FIGS. 1 to 4 depict the ratchet arm 2 in its lower dead center, or its first end position. The ratchet wheel 1, fastened to the (not illustrated) turbine shaft, is provided with teeth, with the ratchet arm 2 engaging the spaces between the teeth for the purpose of turning the ratchet wheel intermittently. In order to turn the ratchet wheel 1 by one pitch, the ratchet arm 2 performs one working and one idle stroke. The arm 2 moves during its working stroke from the above-mentioned first end position into a second end position, i.e. from its lower dead center to its upper dead center, shown in FIG. 5, thereby turning the ratchet wheel 1 by one pitch. During its idle stroke the ratchet arm 2 will return from the second end position to the first end position, in other words from its upper dead center to its lower dead center, while the ratchet wheel 1 remains stationary.

The motion of the ratchet arm 2, about an axis 3 (visible in FIGS. 2 and 4) which extends parallel to the (not illustrated) axis of the ratchet wheel 1, comprises during its working ing stroke one rectilinear movement and one simultaneous elastic deflection about the axis 3 in the direction of ratchet wheel 1, and during its idle stroke one rectilinear movement in the opposite direction and one simultaneous elastic deflection about axis 3 away from the ratchet wheel 1.

The driving mechanism 21, shown in the form of doubleaction hydraulic cylinder 22 and piston 23, serves to furnish the rectilinear components of the above-described motions, but any other type of reciprocating driving mechanism, for example a pneumatic or an electroactuated mechanism, can also be used.

For the purpose of furnishing the two deflection movements there is provided a single deflection device 4 (see FIGS. 1, 3 and 5), forming one integral unit with ratchet arm 2. This device has a spring-loaded pin 7 which is provided with a collar 13 and which is guided within a laterally offset portion of ratchet arm 2 at its side facing away from the ratchet wheel 1 so that it can move parallel to the longitudinal axis 6 of ratchet arm 2. During normal operations one end 8 of pin 7 will be in permanent contact with a deflection stop 9 which will move to-and-fro together with ratchet arm 2 in accordance with the rectilinear components of its strokes. The other end 10 of pin 7 is seated, axially movable, in a first bore 11 of the offset part of arm 2. The second bore 12, formed within the offset part of arm 2 and coaxial with the first bore 11, guides collar 13 of pin 7 during its axial motion. A helical spring 14, arranged between collar 13 and the closed end surface of the second bore 12, serves for the spring-loading of pin 7. At the open end of the second bore 12 there is placed a locking part 15, for example in the form of a Seeger retaining ring made of spring steel, to prevent pin 7 from dropping out of the second bore 12 of arm 2.

Figure 1:
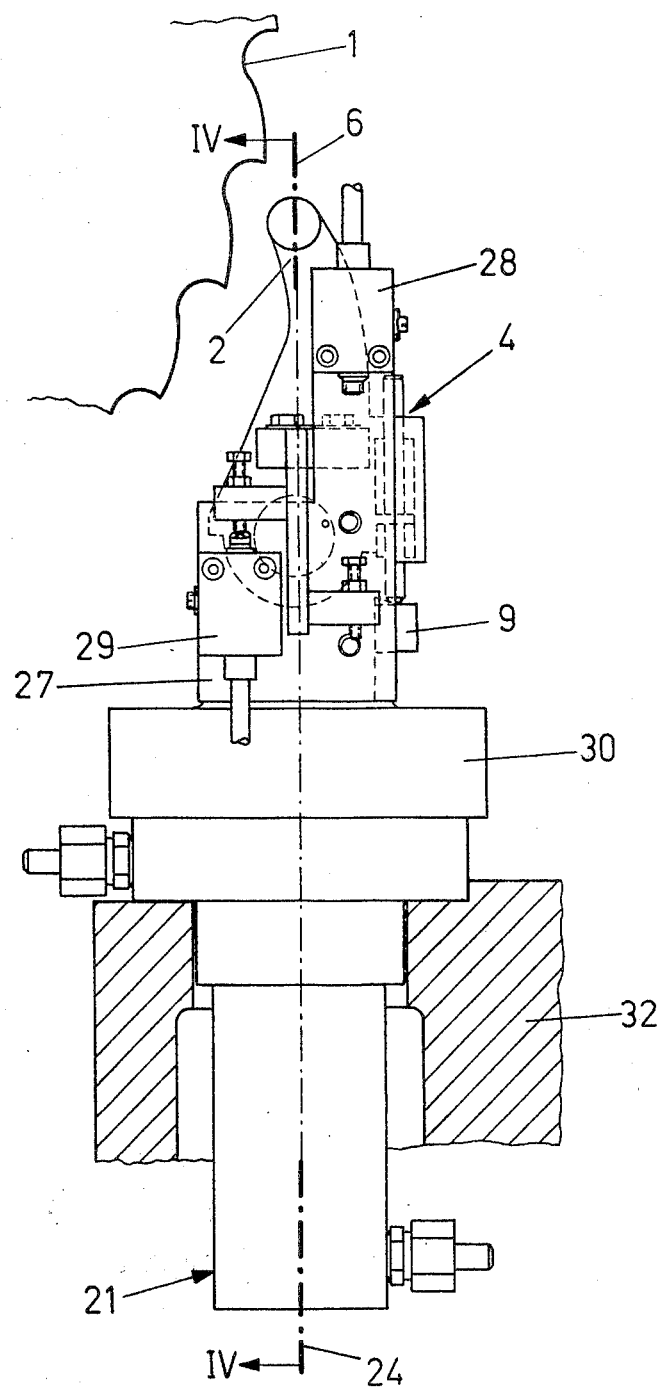
FIG. 1 is an end view of the shaft-turning apparatus, with a ratchet wheel and one ratchet arm to engage the ratchet wheel.
Figure 2:
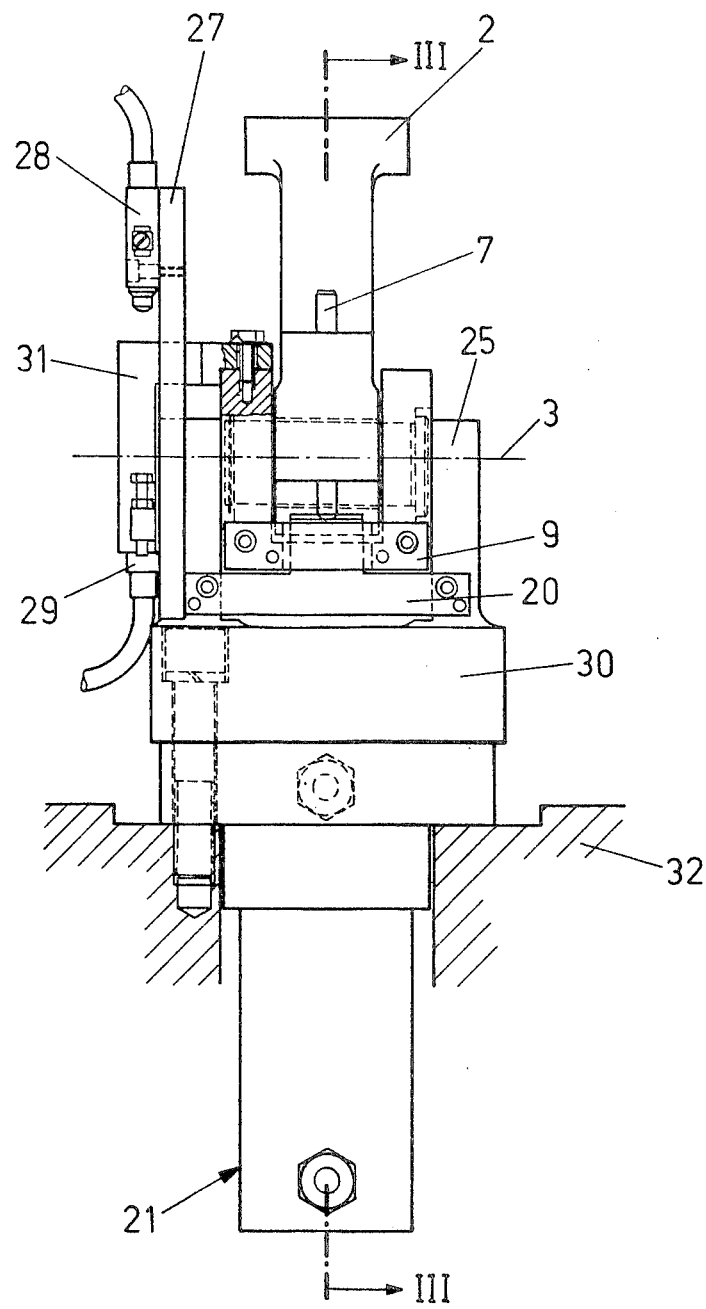
FIG. 2 is a side view of the shaft turning apparatus.
Figure 3:
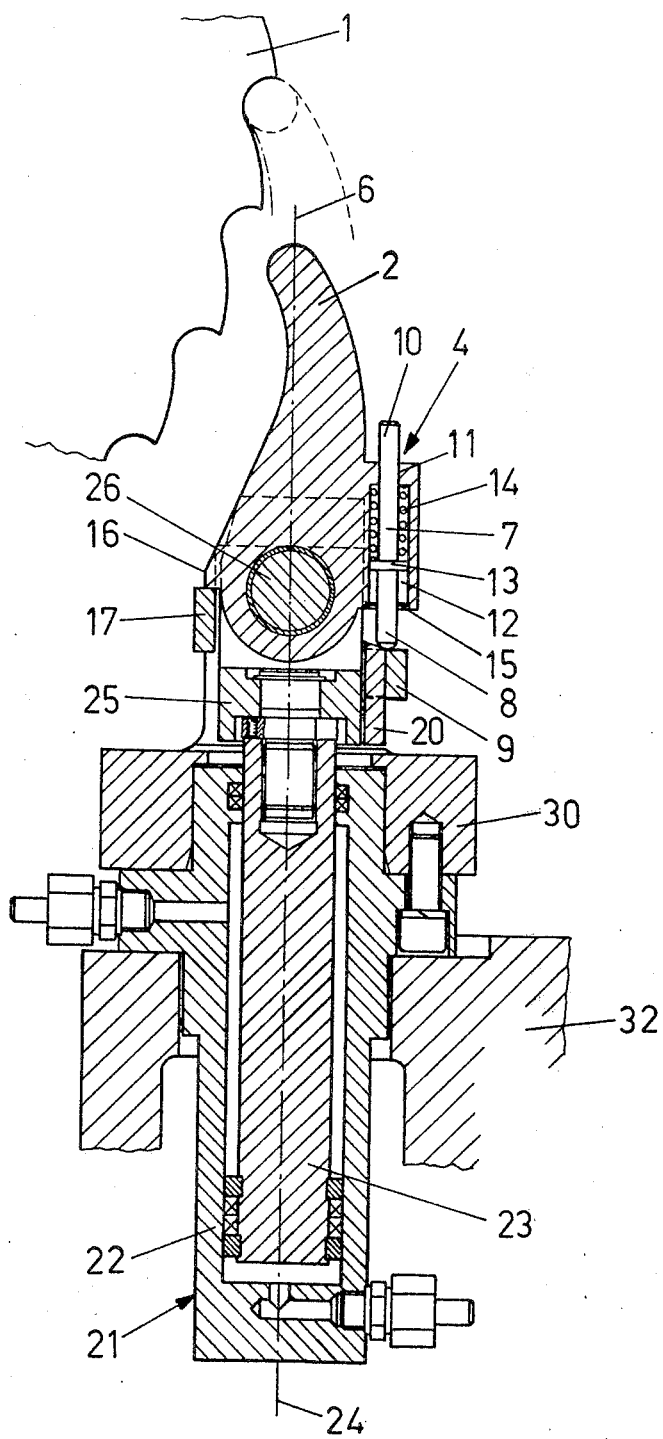
FIG. 3 is a sectional view along line III — III of FIG. 2, with the ratchet arm placed in its first end position.
Figure 4:
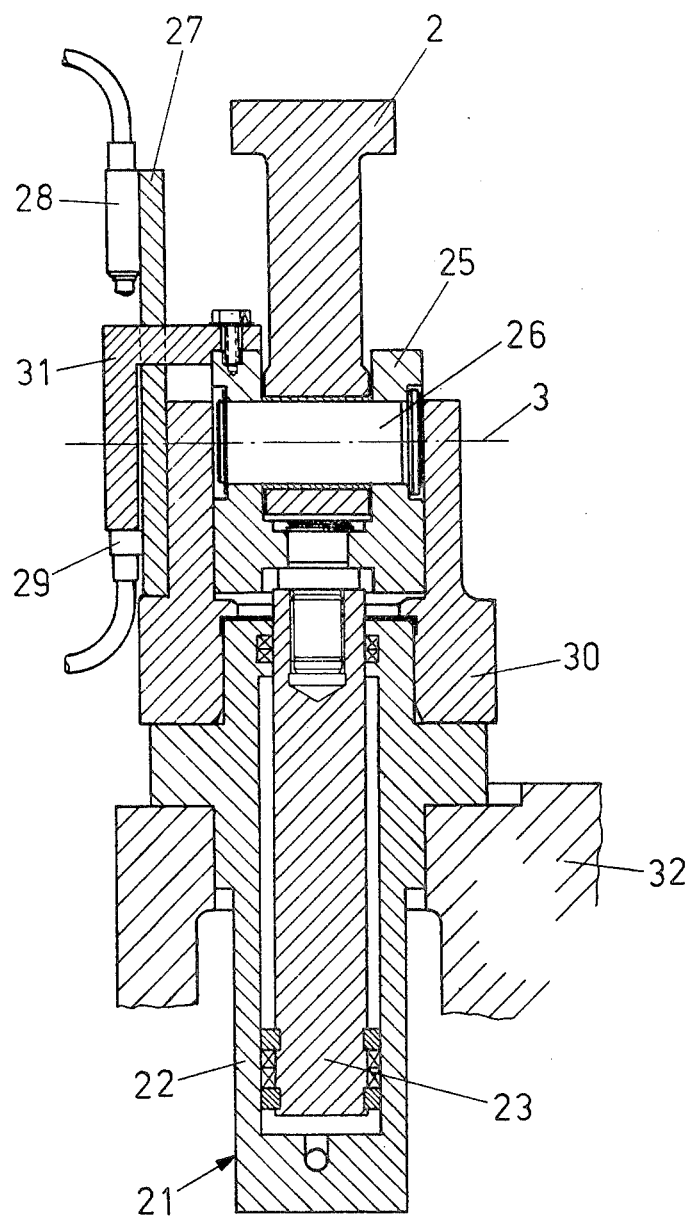
FIG. 4 is a sectional view along line IV — IV of FIG. 1.

The arm 2 is provided at its side facing the ratchet wheel 1 with a stop shoulder 16 which during normal operations is in contact with a stationary retaining plate 17 during the deflecting motions of the arm 2 in the direction of, as well as away from the ratchet wheel 1 (FIG. 3).

When the arm 2 is in its first end position (FIG. 3), the stop 16 rests upon the retaining plate 17, the pin 7 is in contact with the deflection stop 9, the longitudinal axis 6 of the arm 2 extends substantially vertically and tangentially to the pitch of the ratchet wheel 1 in alignment with the axis 24 of the driving mechanism 21. Due to this arrangement any influences caused by the dead weight of the arm 2 are eliminated. Obviously, the longitudinal axis 6 of the arm 2 need not necessarily extend in vertical direction but can run in any direction tangentially to the pitch.

At the beginning of the working stroke, the deflection axis 3 (visible in FIGS. 2 and 4) of the arm 2 is subjected to a rectilinear shift in a substantially tangential direction of the ratchet wheel 1. The stop 16 rests upon the retaining plate 17. Under the influence of the helical spring 14, pin 7 presses simultaneously against the deflection stop 9, causing the upwardly moving arm 2 to deflect in the direction of the ratchet wheel 1, whereby the stop 16 retains its contact with the retaining plate 17, and the pin 7 retaining its contact with the following deflection stop 9. The deflection motion of arm 2 continues until the latter has engaged the nearest tooth of the ratchet wheel 1. When the arm 2 now continues its straight movement, contact between the pin 7 and the stop 9 will be broken, and immediately thereafter contact will also be broken between stop 16 and the retaining plate 17, with the result that the arm 2 will not deflect back but will remain engaged with the specific tooth and turn the ratchet wheel 1 by one pitch to reach its second end position, that is its upper dead center. Now, the downwardly directed idle stroke will occur, with the ratchet wheel 1 remaining at a standstill during this stroke. Arm 2, under load by the pin 7 acting through spring 14, which is now in contact with the deflection stop 9, slides downward along the face of the tooth, remaining in the deflected position in the direction of the ratchet wheel 1 until the stop 16 comes again into contact with the retaining plate 17 which will lift up on the arm 2 and deflect it in the opposite direction to its original neutral position, shown in FIG. 3.

The reciprocating movement of piston 23 is transmitted to the arm 2 by way of a fork 25 which is fixedly connected with the piston 23, and a bolt 26, its two ends rotatably mounted in the fork 25, with the arm 2 arranged in such manner that it can deflect about the axis 3 of the bolt 26. At the fork 25, moving together with the piston 23, there are fixedly arranged the deflection stop 9 and the switch bracket 31. The switch bracket 31, upon reaching the end positions of the stroke, reverses the switches 28, 29 which are arranged at a stationary switch carrier 27 and which in turn will cause the piston 23 to reverse its direction of motion by actuating (not illustrated) solenoid valves.

The reciprocating fork 25 is controlled by a guide part 30 which is fixedly arranged at the cylinder 22. At the guide part 30 there are fastened the retaining plate 17, the switch carrier 27 with the two switches 28, 29 and the release block 20 to be further described.

During the normal operations the ratchet arm 2 is held in disengaged position when the piston 23 is at its lower dead center position. When the working stroke begins, arm 2 is forced by the spring-loaded pin 7 into its engagement with the ratchet wheel 1 and remains self-supporting throughout the entire working stroke. Upon the actuation of the upper switch 28 the direction of motion of the piston 23 is reversed, the arm 2 slides along the rear flank of the teeth back to the lower dead center position, thus arriving at its starting position. The lower switch 29 is actuated and the working cycle starts afresh.

Figure 6:
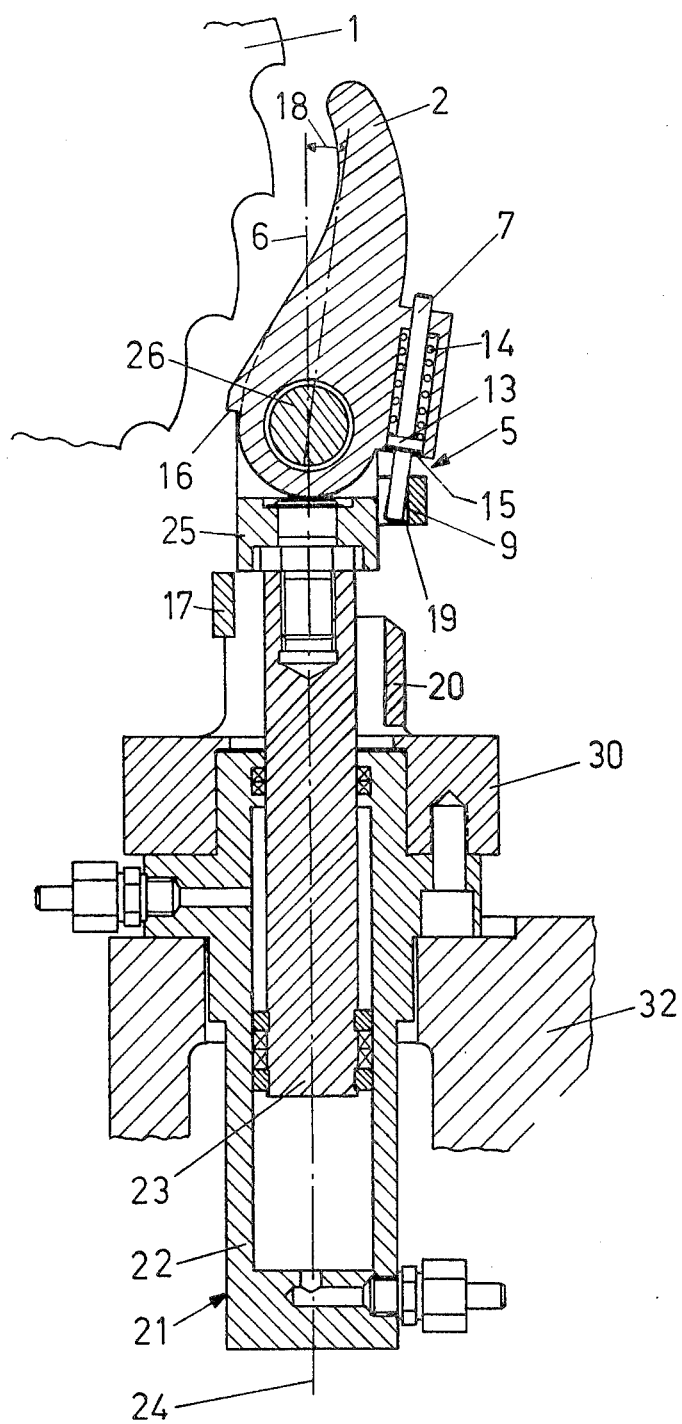
FIG. 6 is a sectional view similar to FIG. 3, with the ratchet arm held in place by the locking device after deflection away from the ratchet wheel.

The electric circuit of the system is arranged in such manner that the piston 23 will always return to lower dead center after the cutoff, i.e. the arm 2 will always be in its disengaged position. If there is a failure, thus leaving the piston 23 in any other position, and the arm 2 still engaging a tooth of the ratchet wheel 1, the arm 2 will be hurled i.e. deflected away at the start of the turbine by the, now rotating, ratchet wheel 1, and will be hurled away further at increasing turbine speed. This occurrence will continue until the arm reaches a deflection angle 18 (FIG. 6) at which the pin 7 is forced by its loading spring 14 behind the deflection stop 9, or into its U-shaped recess 19 respectively (see FIG. 6). The arm 2 is then caught and will no longer be able to tilt in the direction of the ratchet wheel 1. Therefore, the recess 19 arranged within the stop 9 will trap the arm 2 when it has reached a certain, predetermined deflection angle 18 away from the ratchet wheel 1 and thus act, in conjunction with the deflection device 4, as a locking device 5 (FIG. 6).

The release of the caught arm 2 is accomplished as follows: the piston 23 is retracted, with the pin 7 being pressed against the stationary release block 20. As retraction of the piston 23 progresses, pin 7 is pushed back against the spring force, the deflection stop 9 descends gradually to the level of the release block 20, and the pin 7 will slide over the edge of stop 9. The arm 2 can now move freely again and will tilt, under the load of pin 7, to its original starting position.

It is possible and advantageous to install the apparatus proposed by the invention in the lower part 32 of the housing surrounding the shaft so that it can function even with the machine in open position. If the driving mechanism 21 is in the form of a hydraulic cylinder, it is possible to set up the pump unit supplying the pressure fluid either inside or outside the housing surrounding the shaft. If the torque which has to be overcome is very great, it is also possible to employ two or more ratchet arm mechanisms, arranged about the periphery of the ratchet wheel 1.

When compared with the known turbine shaft actuating systems, the apparatus proposed by the invention possesses the following advantageous and significant features:

a. it does not require any gear drive and crank shaft to operate the ratchet arm.
b. the arm engages the ratchet wheel not by means of its own dead weight but by a mechanical coupling and can therefore be installed at the perimeter of the ratchet wheel at any point desired;
c. there is no need for a separate locking device because the deflecting device, which forms an integral unit with the arm, will act, in conjunction with a recess arranged within the deflection stop, in a simple manner as an always properly functioning locking device;
d. it is feasible to arrange several ratchet arm mechanisms at the perimeter of the ratchet wheel if it becomes necessary to overcome very strong torques;
e. the apparatus can be installed within the lower part of the housing surrounding the turbine shaft so that it will remain operational even if the machine is opened;
f. the apparatus is surprisingly simple, substantially less expensive than systems now known and requires less space than the known arrangements.

I claim:

1. Apparatus for turning a power driven shaft such as a turbine rotor shaft about its axis in a step-by-step manner comprising a toothed ratchet wheel mounted on the shaft, a ratchet arm engageable with the teeth on said ratchet wheel, means pivotally mounting said ratchet arm on a support for deflection about an axis parallel to the axis of said ratchet wheel, actuating means for effecting a to and fro rectilinear movement of said ratchet arm support and hence also said ratchet arm from a starting position towards and away from said ratchet wheel, means producing during said to and fro rectilinear movement of said ratchet arm a deflection thereof about its pivot axis towards and away from the toothed periphery of said ratchet wheel, and means carried by said ratchet arm and operable in the event the ratchet wheel is put into rotation by starting up of the turbine while said ratchet arm is engaged with said ratchet wheel for detaining said ratchet arm against a return movement towards said ratchet wheel after being hurled outwardly therefrom to a predetermined position.

2. Apparatus as defined in claim 1 wherein said means for producing a deflection of said ratchet arm about its pivot axis comprises a spring loaded pin mounted at the side of said ratchet arm facing away from said ratchet wheel for movement parallel to the pivotal axis of said ratchet arm, one end of said pin during normal operation being in continuous contact with an arm deflection stop movable rectilinear in the direction of rectilinear movement of said ratchet arm, and the other end of said pin being mounted for movement within a first bore in said ratchet arm.

3. Apparatus as defined in claim 2 wherein said ratchet arm includes a second bore coaxial with said first bore, said pin being provided with a collar guided in said second bore and a helical spring located in said second bore between said collar and the closed end of said second bore for spring loading said pin.

4. Apparatus as defined in claim 3 wherein the open end of said second bore through which said pin projects to engage said arm deflection stop includes means engageable with said collar for preventing said pin from dropping out.

5. Apparatus as defined in claim 2 wherein said ratchet arm is provided with a stop shoulder at the side thereof opposite said spring loaded pin and which is engageable with a stationary stop member when said ratchet arm occupies its position away from said ratchet wheel to hold said ratchet arm in a position such that its longitudinal axis extends substantially tangential to the pitch of said ratchet wheel.

6. Apparatus as defined in claim 5 wherein the longitudinal axis of said ratchet arm extends vertically when located tangential to the pitch of said ratchet wheel thereby to eliminate any adverse influence caused by the dead weight of said ratchet arm.

7. Apparatus as defined in claim 2 wherein a recess is provided adjacent said arm deflection stop and into which the end of said spring loaded pin enters to thereby establish said means for detaining said ratchet arm against return movement when hurled outwardly from said ratchet wheel to said predetermined position.

8. Apparatus as defined in claim 7 and which further includes a stationary pin release member aligned with said recess and engageable with said pin upon a return movement of said ratchet arm from said ratchet wheel to its starting position to eject said pin from said recess and thereby re-engage said arm deflection stop and deflect said ratchet arm in the opposite direction to its initial position.

* * * * *